UNITED STATES PATENT OFFICE.

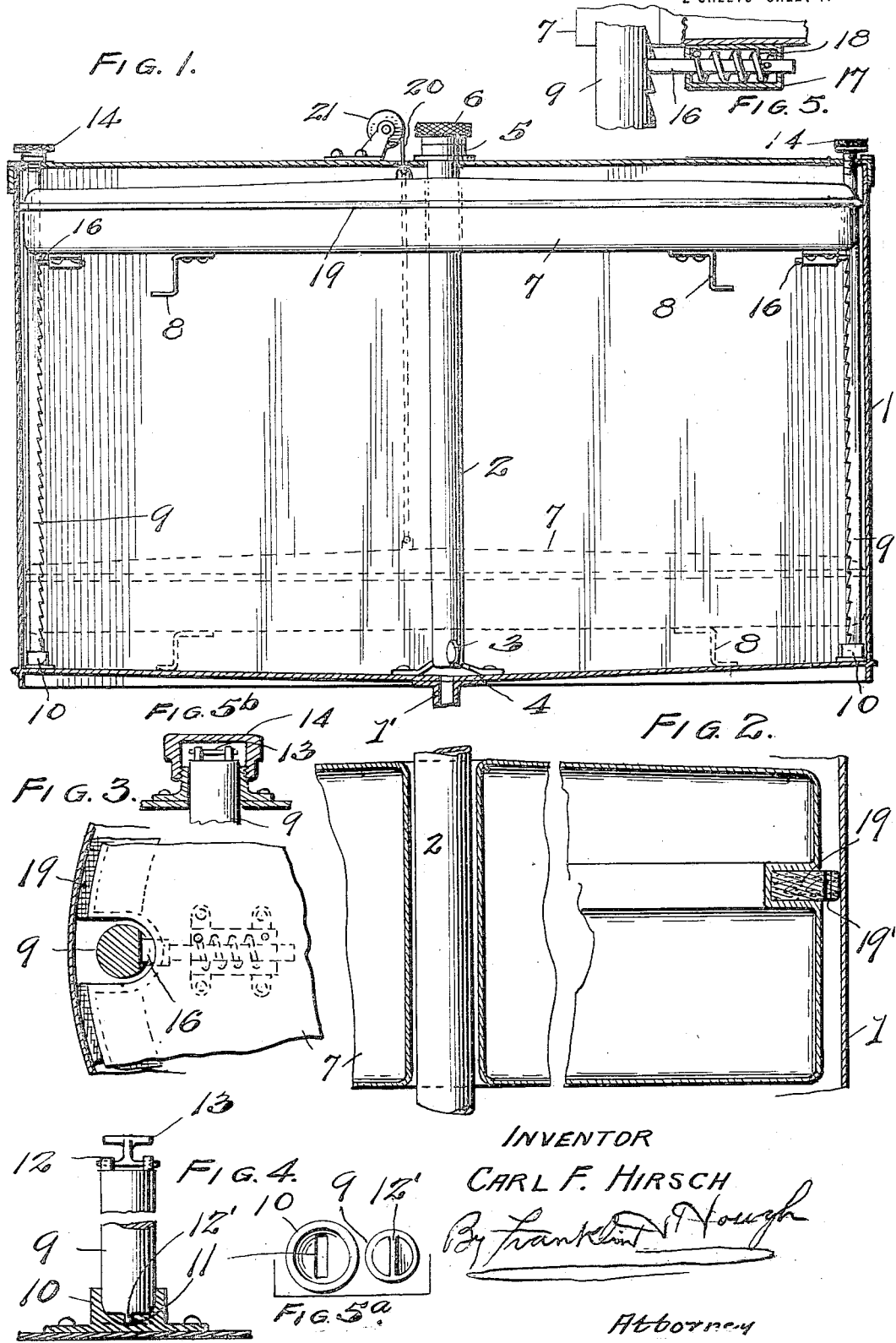

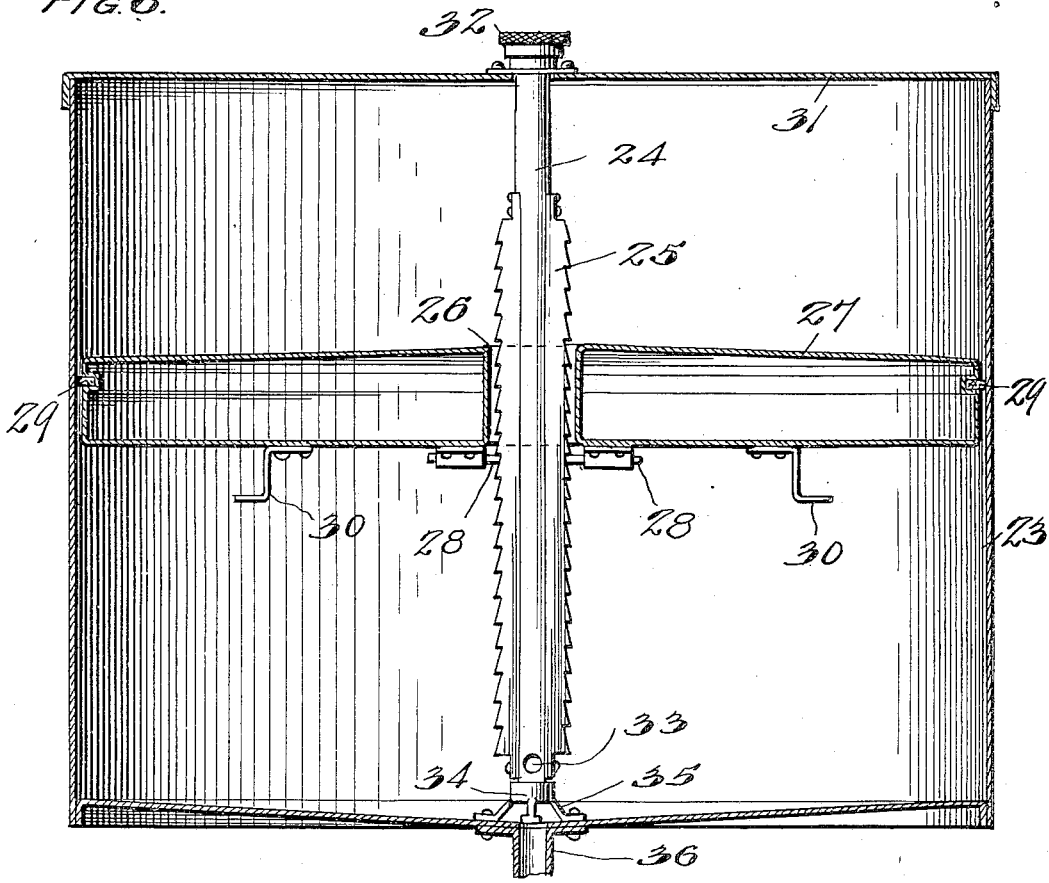
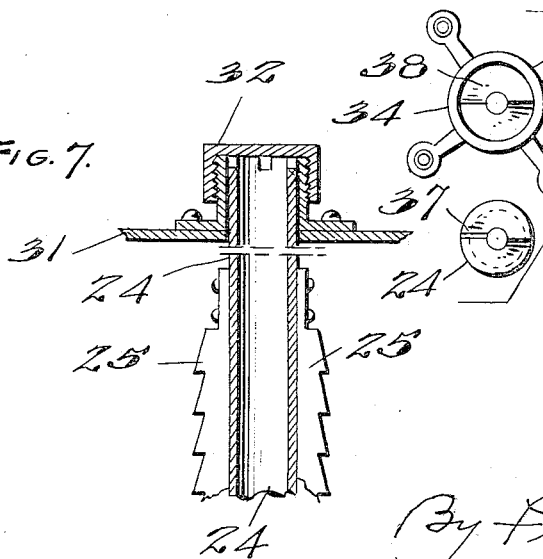
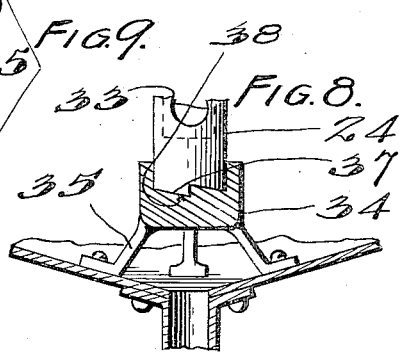

CARL F. HIRSCH, OF PHILADELPHIA, PENNSYLVANIA, ASSIGNOR TO AUGUSTA HIRSCH, OF PHILADELPHIA, PENNSYLVANIA.

FLOAT CONTROL FOR OIL-TANKS.

1,294,265.  Specification of Letters Patent.  Patented Feb. 11, 1919.

Application filed July 31, 1918. Serial No. 247,559.

*To all whom it may concern:*

Be it known that I, CARL F. HIRSCH, a citizen of the United States, residing at Philadelphia, in the county of Philadelphia and State of Pennsylvania, have invented certain new and useful Improvements in Float Controls for Oil-Tanks; and do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in float actuated mechanism for preventing liquid in tanks from swashing about and affording means for automatically reducing the space within the tank as the liquid is dispensed.

More specifically the present invention consists in the provision of a float in the form of an air tank, having a gasket about its circumference and automatically held in different adjusted positions as it lowers with the surface of the liquid upon which the float rests, means being provided to permit the float to again rise with the liquid.

My invention is illustrated in the accompanying drawings which, with the letters of reference marked thereon, form a part of this application and in which:

Figure 1 is a central vertical sectional view through the tank.

Fig. 2 is an enlarged detail in vertical section through a portion of the float and tank.

Fig. 3 is a detailed cross sectional view through the wall of the tank, showing in top plan view a portion of the float.

Fig. 4 is an enlarged detailed sectional view through a socket member holding the central filling tube.

Fig. 5 is an enlarged detail in section, showing the manner of holding the float in adjusted position.

Fig. 5ᵃ is a detailed view, showing the manner of holding the filling tube from rotating.

Fig. 5ᵇ is a detailed sectional view through the upper portion of a rack bar.

Fig. 6 is a vertical sectional view through the tank and float, showing a modified form of the invention.

Fig. 7 is an enlarged detail sectional view through the upper portion of the filling tube.

Fig. 8 is a sectional view through the lower portion of the filling tube and bottom of the tank, and Fig. 9 is a detailed view of the cam in the socket and bottom of the tube, adapted to engage the same.

Reference now being had to the details of the drawings by numerals:

1 designates a tank of any suitable size or shape, provided with an exit opening 1' in the bottom thereof, and 2 is a filling tube, which has an exit opening 3 near its lower end, and 4 designates fingers which project from the tube and which are fastened to the bottom of the tank, and serve as means for supporting the filling tube a slight distance above the bottom of the tank. Said tube passes through an aperture in the top of the tank and also a collar 5, which has a threaded cap 6 fitted over the upper end thereof, forming a closure to the space about the tube which passes through the top of the tank. Mounted within the tank is a float 7 which is hollow and centrally apertured to receive the filling tube 2 which passes through the same. Bracket members 8 are mounted upon the under surface of the float, and are designed to contact with the upper surface of the bottom of the tank when the float is at its lowest limit and which will at all times prevent the bottom of the float extending below the exit opening 3. Rack bars 9 are mounted in socket members 10, a detail of one of which is shown in Fig. 4 of the drawings, and the bottom of each socket member, as shown in Fig. 5ᵃ of the drawings, is provided with a slot 11 adapted to receive the rib 12 which is formed at the lower end of the rack bar 9 and which tends to prevent the latter from being turned when adjusted in the manner shown in Fig. 4, making it necessary to raise the bar slightly before the rack bar may be rotated. Pivotally connected to the lugs 12 upon the upper end of the rack bar is a handle 13 which will turn down against the top of the bar, when it is desired to place the threaded cap 14, detail of which is shown in Fig. 5ᵇ of the drawings, over the top of the bar and fitted to a threaded collar 15 secured to the top of the tank about the aperture through which the bar passes.

Spring pressed pawls 16, one of which is shown in Fig. 5 of the drawings, are mounted in boxings 17, said pawls being thrown to their limit in one direction through the medium of the coiled springs 18, and adapted to engage the teeth of the rack bars, two of said pawls arranged at points diametrically opposite each other, as shown in Fig. 1 of the drawings. A gasket 19 surrounds and is secured to the float and is adapted to wipe against the inner surface of the tank to prevent any liquid passing up between the gasket and the wall of the tank as the float lowers.

A tape 20 is adapted to wind about a reel 21 mounted upon the top of the tank, said tape being spring actuated, and passes through a hole in the top of the tank and is secured to the float. Said tape is designed to have a marking thereon, in order that the location of the float within the tank may be indicated thereby.

In Fig. 6 of the drawings I have shown a slight modification of my invention in which the tank, designated by numeral 23, is provided with a combination central filling tube 24 having two rack bars 25 fastened thereto, and which rack bars and tube pass through an opening 26 formed centrally in the float 27. Said float is provided with spring pressed pawls 28 designed to engage the teeth of the rack bars 25. In the modified form the gasket 29 is placed about the float, for the purpose before described, and brackets 30 are fastened to the under surface of the float. The top of the tube 24 passes through a central opening 31 in the tank and has a cap 32 fitted thereto, and 33 is an exit opening through which liquid is permitted to pass into the lower portion of the tank.

In the modified form shown in Fig. 6 of the drawings a socket member 34 is provided, having legs 35 fastened to the bottom of the tank, and 36 is an exit tube leading from the bottom of said tank through which the supply of liquid may be drawn from the tank.

Upon reference to Figs. 8 and 9 of the drawings, it will be noted that the lower portion of the tube 24 below the exit opening 23 is solid and has a cam end 37, bottom plan view of which is shown in Fig. 9, and which engages a similar shaped cam bottom 38 formed in the socket member 34 and by which means the filling tube 24 may be elevated slightly as it is rotated, for the purpose of permitting the pawls to disengage the rack teeth when it is desired to permit the float to rise with the liquid which may be poured into the tank to replenish the supply.

The operation of my invention will be readily understood as follows: As oil is poured into the tank through the opening in the central tube, the float will be permitted to rise on the surface of the liquid when the rack bars 9, shown in Fig. 1 of the drawings, are turned so that the pawls will disengage the teeth thereon. The turning of the rack bars is accomplished through the handles 13, detail of one of which is shown in Fig. 4 of the drawings. After the float has risen to its highest limit, or as high as it will rise on the surface of the liquid, the rack bars may be given a partial axial movement to throw the teeth into engagement with the pawls and held in such positions through the medium of the ribs and slots shown in Fig. 4 of the drawings.

The apparatus is now in readiness for dispensing the liquid and, as it is drawn off the bottom of the tank, the float will lower upon the surface of the liquid, the gasket about the float wiping against the inner surface of the tank, thus affording means for preventing any space intervening between the surface of the liquid and the float, and having the effect of a tank which is always filled, and preventing any swashing around of the liquid.

By the provision of a tank made in accordance with my invention, fuel when carried upon air ships, automobiles, or other vehicles may be prevented from becoming unduly agitated by the swaying movements of the tank, and which is considered an important desideratum, especially in aerial navigation.

What I claim to be new is:

1. An automatic float for tanks, comprising a liquid receptacle a hollow float, a vertically disposed axially movable rack bar, a pawl carried by the float and designed to engage the teeth of said rack bar, a gasket about the float and adapted to wipe against the inner surface of the receptacle, means for locking the rack bar when in its lowest normal position, the latter being permitted to be rotated, when raised slightly, for the purpose of disengaging the teeth of the rack bar, from said pawl.

2. An automatic float for tanks, comprising a liquid receptacle a hollow float therein and having a circumferential gasket wiping against the inner surface of the receptacle, pawls carried by the float, vertically movable rack bars, socket members within the receptacle and each having a slot in its bottom, the lower end of each rack bar having a rib normally engaging one of said slots, and means attached to each rack bar for imparting a partial rotation thereto, after the rack bar has been raised a slight distance.

3. An automatic float for tanks, comprising a liquid receptacle, a hollow float therein and having a circumferential gasket thereon designed to wipe against the inner surface of the receptacle, said float having diametrically disposed recesses in its marginal edge, socket members mounted upon the upper surface of the bottom of the receptacle and having each a slot in its bottom, vertically movable rack bars each having a rib upon its lower end for engagement with a slot in the socket member, said rack bars passing through said recesses and serving to guide the float, and pawls carried by the float adjacent to the recesses in the latter and engaging the teeth of the rack bars.

In testimony whereof I hereunto affix my signature in presence of two witnesses.

CARL F. HIRSCH.

Witnesses:
A. L. HOUGH,
I. WHITTEMORE.